L. MACH.
AIMING DEVICE FOR GUNS.
APPLICATION FILED OCT. 9, 1912.
1,060,469.  Patented Apr. 29, 1913.
Fig. 1.  Fig. 4.  Fig. 5.
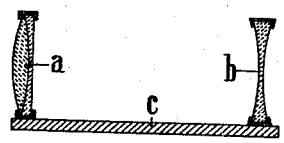 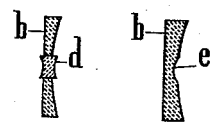
Fig. 2.  Fig. 3.
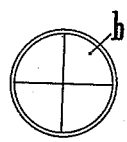 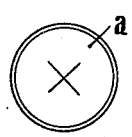
Fig. 6.
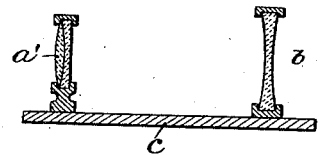
Witnesses—
Robert I. Hulsizer.
Edith C. Tate.
Inventor
Ludwig Mach
by Byrnes Townsend & Brickenstein
Att'ys.

UNITED STATES PATENT OFFICE.

LUDWIG MACH, OF VIENNA, AUSTRIA-HUNGARY.

AIMING DEVICE FOR GUNS.

1,060,469.  Specification of Letters Patent.  Patented Apr. 29, 1913.

Application filed October 9, 1912. Serial No. 724,834.

*To all whom it may concern:*

Be it known that I, LUDWIG MACH, a citizen of the Austro-Hungarian Empire, residing at Vienna, Austria-Hungary, have invented certain new and useful Improvements in Aiming Devices for Guns, of which the following is a specification.

My invention relates to an aiming device for guns and consists in an arrangement of an objective provided with a pointing mark, an ocular likewise provided with a pointing mark and so correlated to each other that the same form a telescope of the well-known Galilean type. Such optical system is in practice so used that said objective and ocular are positioned both within the range of sharp sight of the observer so that same may perceive the pointing mark on the objective and that on the ocular together with an image of the distant object to be aimed at and produced by the optical device which forms the Galilean telescope. In order to allow quick orientation it is advisable to make the ocular lens of larger diameter than the objective and to arrange it in such a manner that rays from distant objects may directly impinge thereon or on its peripheral part without previously passing through said objective. In this way the observer perceives the enlarged image of the distant object to be aimed at within a peripheral field showing the distant objects as they are seen by directly looking thereon through the ocular lens or its peripheral part.

The invention is illustrated on the accompanying drawing.

Figure 1 is a longitudinal section through an embodiment of the new aiming device. Figs. 2 and 3 are views of the ocular and of the objective respectively. Figs. 4 and 5 show modifications of the ocular lens. Fig. 6 is a longitudinal section of a modified device, showing the ocular lens of larger diameter than the objective lens.

The numeral $a$ designates an objective and the numeral $b$ an ocular which form together a so-called Galilean telescope. The objective $a$ is provided with a pointing mark consisting in a cross the two beams of which are preferably made of broad lines. Instead of a cross every other form of pointing mark would suit with the purpose. The ocular $b$ is likewise provided with a pointing mark in the form of a cross the two beams of which in this case preferably pass through the whole diameter of the lens. The objective and the ocular are mounted both on a rigid bar $c$. The objective and the ocular are positioned at a comparatively small distance from each other say from 8 to 15 centimeters. The bar $c$ which carries the lenses $a, b$ is so fixed on the gun that the eye of the observer remains at a distance from say 8 centimeters from the ocular so that the observer perceives the ocular and the objective and the pointing marks thereon both within the range of sharp sight; an image of the distant object aimed at appearing likewise within the range of sharp sight.

The ocular lens $b$ is shown in Fig. 6 as having a larger diameter than the objective lens $a'$, so that rays coming from distant objects may impinge on the peripheral part of the ocular lens without previously passing through the objective. The observer, therefore, perceives besides the mentioned image of the distant objects to be aimed at produced by combined action by the objective and the ocular an image of the field inclosing an image of diminished size showing the landscape inclosing the objects which are perceived in the central field of view of the telescope. This allows quick orientation. In order to adapt the instrument to the aiming on objects in different distances instead of the one horizontal cross line in the ocular shown in Fig. 2 of the drawing a plurality of horizontal lines may be provided. The crossing point of each said lines forming a pointing mark is, to be brought into coöperation with the pointing mark on the object.

As apparent from the previous description only the central part of the ocular is used for the formation of the image of the distant object to be aimed at whereas the peripheral part of the ocular only serves the purpose of producing an image of diminished size of the landscape surrounding the object to be aimed at. For the production of such image a smaller curvature of the lens is sufficient and advisable in order to avoid the image of the landscape becoming too small. Therefore, the forms of the ocular shown in Figs. 4 and 5 are shown with the central part of higher curvature and a peripheral part of smaller curvature. The pointing marks on the objective and the ocular may be made self-luminous, as by the use of any of the well-known phosphorescent paints. This allows the use of the device in twilight.

What I claim is:

1. Aiming device for guns comprising a Galilean telescope, said telescope being provided with an objective having a pointing mark thereon, an ocular lens of larger diameter than the objective and likewise provided with a pointing mark thereon and allowing at least in its peripheral part rays of light from distant objects to directly impinge thereon without previously passing through said objective, said objective and ocular being positioned with relation to each other and to the eye of the observer within the range of sharp sight.

2. Aiming device for guns comprising an objective and an ocular of larger diameter than said objective both provided with pointing marks and mounted so as to stand free in the open air and so correlated to each other as to form a telescope of the Galilean type and so positioned with relation to the eye of the observer that said objective and said ocular are both within the range of sharp sight.

3. Aiming device for guns comprising an objective and an ocular both provided with pointing marks and forming together a telescope of the Galilean type the ocular lens being larger in diameter than the objective and provided with a central part of higher curvature and a peripheral part of smaller curvature.

4. Aiming device comprising an objective provided with a pointing mark and an ocular of larger diameter than the objective and likewise provided with a pointing mark, said objective and ocular mounted so as to stand free in the open air and forming together a Galilean telescope.

5. Aiming device comprising an objective provided with a self-luminous pointing mark and an ocular of larger diameter than the objective and likewise provided with a self-luminous pointing mark, said objective and ocular mounted so as to stand free in the open air and forming together a telescope of the Galilean type.

In testimony whereof I affix my signature in presence of two witnesses.

LUDWIG MACH.

Witnesses:
 WOLDEMAR HAUPT,
 HENRY HASPER.